United States Patent
Malavalli et al.

(10) Patent No.: US 9,308,940 B1
(45) Date of Patent: Apr. 12, 2016

(54) VEHICLE FRONT STRUCTURE FOR ABSORBING SMALL OFFSET IMPACT FORCES

(71) Applicants: Anantha M Malavalli, West Bloomfield, MI (US); Kyle Kindle, Auburn Hills, MI (US); Patrick J Gibbons, Royal Oak, MI (US)

(72) Inventors: Anantha M Malavalli, West Bloomfield, MI (US); Kyle Kindle, Auburn Hills, MI (US); Patrick J Gibbons, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/573,768

(22) Filed: Dec. 17, 2014

(51) Int. Cl.
   *B62D 21/15*    (2006.01)
   *B62D 25/08*    (2006.01)
   *B60R 19/34*    (2006.01)

(52) U.S. Cl.
   CPC .............. *B62D 21/152* (2013.01); *B60R 19/34* (2013.01); *B62D 25/082* (2013.01)

(58) Field of Classification Search
   CPC ...... B60R 19/34; B62D 21/15; B62D 21/152; B62D 21/157; B62D 25/082; B62D 25/085
   USPC ............... 296/187.09, 187.1, 193.09, 203.02; 293/132, 133
   See application file for complete search history.

(56) References Cited

U.S. PATENT DOCUMENTS

| | | | |
|---|---|---|---|
| 8,596,711 B2 * | 12/2013 | Yasui ...................... | B60R 19/34 296/187.09 |
| 8,684,451 B1 | 4/2014 | Park et al. | |
| 8,764,096 B2 * | 7/2014 | Han ........................ | B60R 19/34 296/133 |
| 8,789,877 B2 * | 7/2014 | Ohnaka ................ | B62D 21/152 296/187.09 |
| 8,919,835 B1 * | 12/2014 | Han ........................ | B62D 21/11 293/133 |
| 9,004,576 B2 * | 4/2015 | Sakakibara .......... | B62D 25/085 293/133 |
| 2015/0035316 A1 * | 2/2015 | Kuriyama ............ | B62D 21/152 296/187.1 |
| 2015/0183468 A1 * | 7/2015 | Shirooka .............. | B62D 25/082 296/187.1 |

* cited by examiner

*Primary Examiner* — Jason S Daniels
(74) *Attorney, Agent, or Firm* — Ralph E. Smith

(57) ABSTRACT

A vehicle has a front structure that includes a pair of side rails, front members, and inner braces. Each front member is coupled to a front end of one side rail and extends laterally outward at least partially into a respective outer quarter of a total width of the vehicle. In an aspect, each inner brace includes a transverse wall and a base. The transverse wall has a side edge extending longitudinally along a respective one of the side rails and a leading edge extending laterally outward from that rail. The base extends diagonally between and is coupled to a respective front member and rail. A leading edge of the base is coupled to the front member within the respective outer quarter. In an aspect, the front structure includes outer braces that surround the inner braces.

14 Claims, 6 Drawing Sheets

VEHICLE FRONT STRUCTURE FOR ABSORBING SMALL OFFSET IMPACT FORCES

FIELD

The present disclosure relates to a vehicle having a front structure for absorbing small offset impact forces.

BACKGROUND

This section provides background information related to the present disclosure which is not necessarily prior art.

Vehicles conventionally have an internal body structure including a pair of rails extending longitudinally along the front of the vehicle and on opposite sides of the vehicle's power plant (e.g. engine). A bumper typically extends along the front of the vehicle, between the two rails. The rails typically support the power plant and any number of vehicle components or body panels. The bumper and rails are conventionally designed to absorb some of the forces that can occur during an impact event by deforming. The degree and location of such deformation can determine the trajectory of the vehicle during and after the impact event, and can influence the forces experienced by vehicle occupants. One type of impact event is known as a small offset impact where only the outer 25% of the vehicle's width is impacted during the impact event.

SUMMARY

This section provides a general summary of the disclosure, and is not a comprehensive disclosure of its full scope or all of its features.

In accordance with an aspect of the present disclosure a vehicle has a front structure that includes a left and a right side rail, a left and a right front member, and a left and a right inner brace. The left side rail extends longitudinally in a front portion of the vehicle on a left side of an engine of the vehicle. The right side rail extends longitudinally in the front portion of the vehicle on a right side of the engine of the vehicle. The left front member is coupled to a front end of the left side rail and extends in a laterally outward direction from the left side rail and is at least partially disposed in an outer left quarter of a total width of the vehicle. The right front member is coupled to a front end of the right side rail and extends in a laterally outward direction from the right side rail and is at least partially disposed in an outer right quarter of the total width of the vehicle. In an aspect, the left inner brace includes a transverse wall and a base. The transverse wall of the left inner brace has a side edge that extends longitudinally along the left side rail and a leading edge that extends laterally outward from the left side rail. The base of the left inner brace is coupled to the transverse wall of the left inner brace and extends diagonally between and is coupled to the left front member and the left side rail. A leading edge of the base of the left inner brace is coupled to the left front member within the outer left quarter of the total width of the vehicle. In an aspect, the right inner brace includes a transverse wall and a base. The transverse wall of the right inner brace has a side edge that extends longitudinally along the right side rail and a leading edge that extends laterally outward from the right side rail. The base of the right inner brace is coupled to the transverse wall of the right inner brace and extends diagonally between and is coupled to the right front member and the right side rail. A leading edge of the base of the right inner brace is coupled to the right front member within the outer left quarter of the total width of the vehicle.

In accordance with an aspect of the present disclosure the front structure includes a left outer brace and a right outer brace. The left outer brace is coupled to the left side rail and surrounds the base of the left inner brace. The right outer brace is coupled to the right side rail and surrounds the base of the right inner brace.

In accordance with an aspect of the present disclosure the left inner brace is coupled to the left outer brace and the right inner brace is coupled to the right outer brace.

In accordance with an aspect of the present disclosure each outer brace includes top side, a bottom side, and a base that extends between the top and bottom sides. At least a portion of the base of the left outer brace extends diagonally between the left front member and the left side rail. At least a portion of the base of the right outer brace extends diagonally between the right front member and the right side rail.

In accordance with an aspect of the present disclosure the base of the left outer brace is spaced apart from the base of the left inner brace and the base of the right outer brace is spaced apart from the base of the right inner brace.

In accordance with an aspect of the present disclosure the front structure includes right and left load beams. Each load beam has a main portion and a front end. The main portion of each load beam at least partially defines a respective wheel well of the vehicle. The front end of the right load beam is coupled to the right outer brace and the front end of the left load beam is coupled to the left outer brace.

In accordance with an aspect of the present disclosure the front structure includes a left support member and a right support member. The left support member extends between the left side rail and the main portion of the left load beam. The left outer brace is coupled to the left support member. The right support member extends between the right side rail and the main portion of the right load beam. The right outer brace is coupled to the right support member.

In accordance with an aspect of the present disclosure the front structure includes a left inner crush can and a right inner crush can. The left inner crush can is mounted to the left front member on a front side of the left front member. The leading edge of the base of the left inner brace is disposed laterally outboard of the left inner crush can. The right inner crush can is mounted to the right front member on a front side of the right front member. The leading edge of the base of the right inner brace is disposed laterally outboard of the right inner crush can.

In accordance with an aspect of the present disclosure the front structure includes a left outer crush can and a right outer crush can. The left outer crush can is mounted to the left front member on the front side of the left front member and laterally outboard of the left inner crush can. The leading edge of the base of the left inner brace is coupled to the left front member at a point laterally between the left inner and left outer crush cans. The right outer crush can is mounted to the right front member on the front side of the right front member and laterally outboard of the right inner crush can. The front edge of the base of the right inner brace is coupled to the right front member at a point laterally between the right inner and right outer crush cans.

In accordance with an aspect of the present disclosure each side rail is disposed proximate to a respective one of a pair of offset axes. Each respective offset axis is disposed on a same side of the vehicle as each corresponding side rail. Each offset axis is offset from a central longitudinal axis of the vehicle by twenty-five percent of a total lateral width of the vehicle.

In accordance with an aspect of the present disclosure the base and the top and bottom sides of each of the left and right outer braces form a generally U-shaped cross-section open toward the left and right side rails, respectively.

In accordance with an aspect of the present disclosure each side rail includes a top side, a bottom side, an inner side, and an outer side that form a tubular structure. A portion of the top side of each outer brace overlaps with the top side of the side rail coupled to that outer brace, and a portion of the bottom side of the outer brace overlaps with the bottom side of the side rail coupled to that outer brace.

In accordance with an aspect of the present disclosure each inner brace includes a transverse wall that extends laterally inward from the base of the inner brace toward the side rail to which that inner brace is coupled.

In accordance with an aspect of the present disclosure the transverse wall of each inner brace overlaps with one of the top and bottom sides of the side rail to which that inner brace is coupled.

In accordance with an aspect of the present disclosure each inner brace includes a flange that extends laterally inward from the base of that inner brace and is coupled to one of the top and bottom sides of the outer brace.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present disclosure relates to a vehicle having a front structure for small offset impacts. This vehicle front structure absorbs some of the impact forces and transfers some of the longitudinal forces into lateral movement of the vehicle away from the point of impact, as will be described below. While illustrated and described with reference to the left side of the vehicle, it is understood that the vehicle is constructed symmetrically with regards to the left and right sides of the front structure of the present disclosure.

Figure 1:
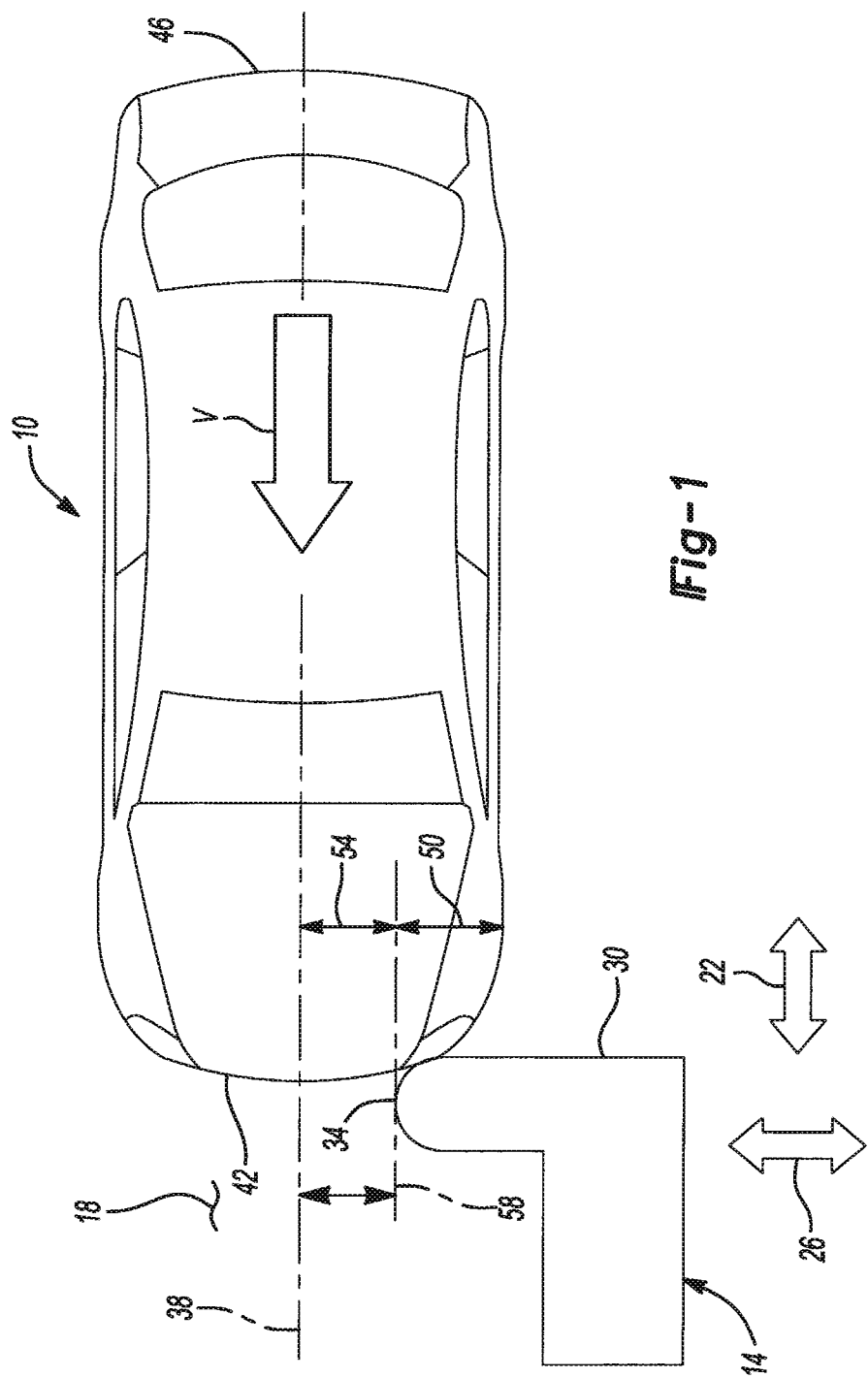
FIG. 1 is a top elevated view of an example of a vehicle and an impact body in accordance with the present disclosure.

With reference to FIG. 1, an example vehicle 10 is illustrated with an impact body or barrier 14 positioned in accordance with the Insurance Institute for Highway Safety ("IIHS") small offset front impact testing. The barrier 14 is a rigid barrier such that the barrier 14 is fixed to the ground 18 to prevent movement of the barrier 14 in a longitudinal direction 22 or a lateral direction 26. The barrier 14 has an impacting face 30 and a generally rounded end 34. The vehicle 10 has a velocity V in the longitudinal direction 22 toward the barrier 14. In the example provided, the vehicle 10 has no velocity in the lateral direction 26 and the vehicle's 10 velocity V is perpendicular to the impact surface 30. In the example provided, the velocity V is 40 mph, though other speeds can be used. The vehicle 10 has a central axis 38 running longitudinally through the vehicle 10 from a front 42 to a rear 46 of the vehicle 10 and bisecting the vehicle 10. The barrier 14 is positioned to impact the vehicle 10 in an outer quarter 50, i.e. outer 25%, of the vehicle's 10 total lateral width. In the example provided, the outer quarter 50 is delineated from an inner quarter 54 by an offset axis 58 that is offset from the central axis 38 by 25% of the total lateral width of the vehicle 10. In other words, the vehicle 10 and barrier 14 are positioned such that when the vehicle 10 impacts the barrier 14, the end 34 generally aligns with the offset axis 58.

Figure 2:
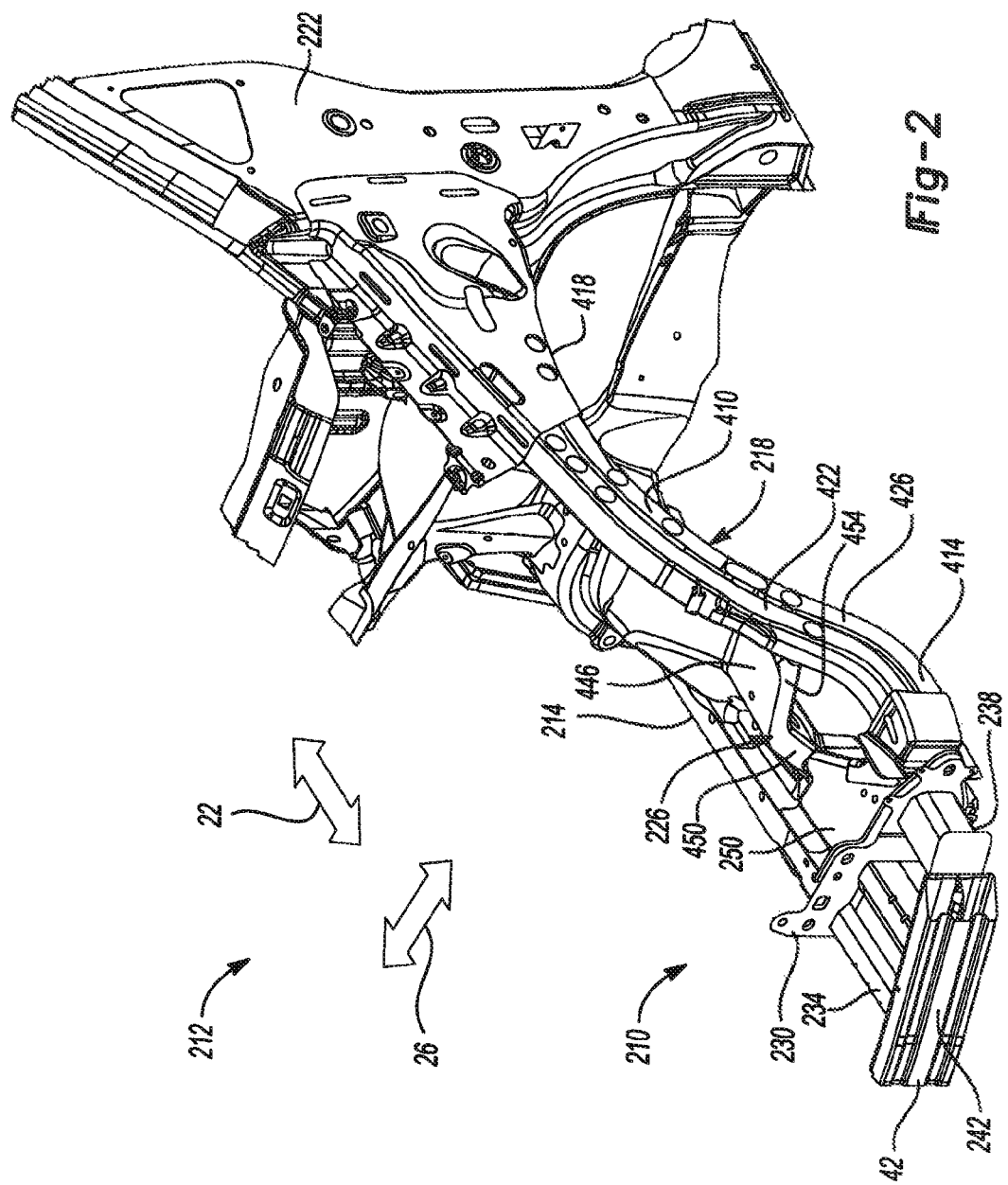
FIG. 2 is a perspective view of a front left portion of a front structure of the vehicle of FIG. 1.
Figure 3:
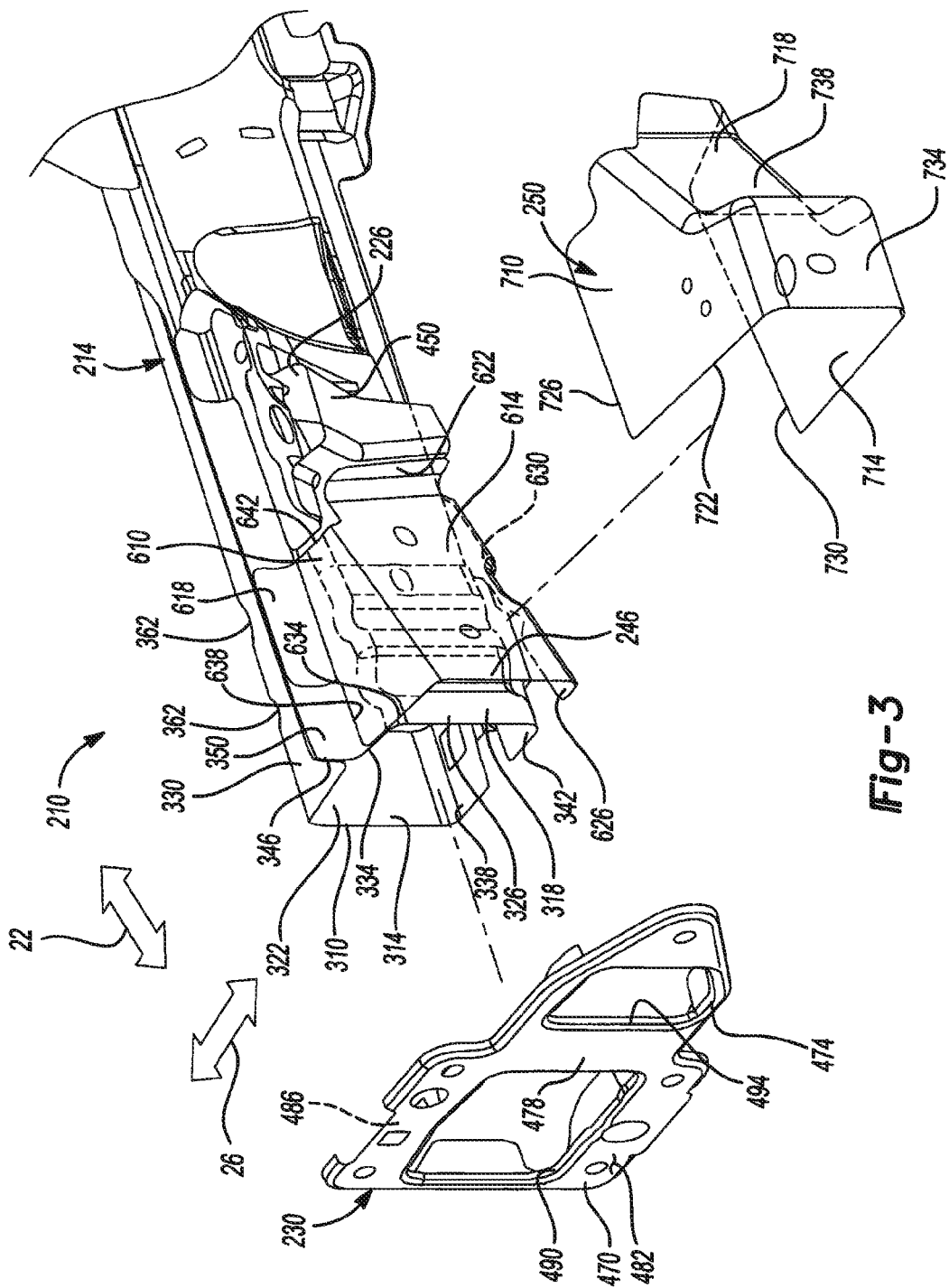
FIG. 3 is a partially exploded perspective view of a portion of the front left portion of FIG. 2, illustrating an inner brace and an outer brace.
Figure 4:
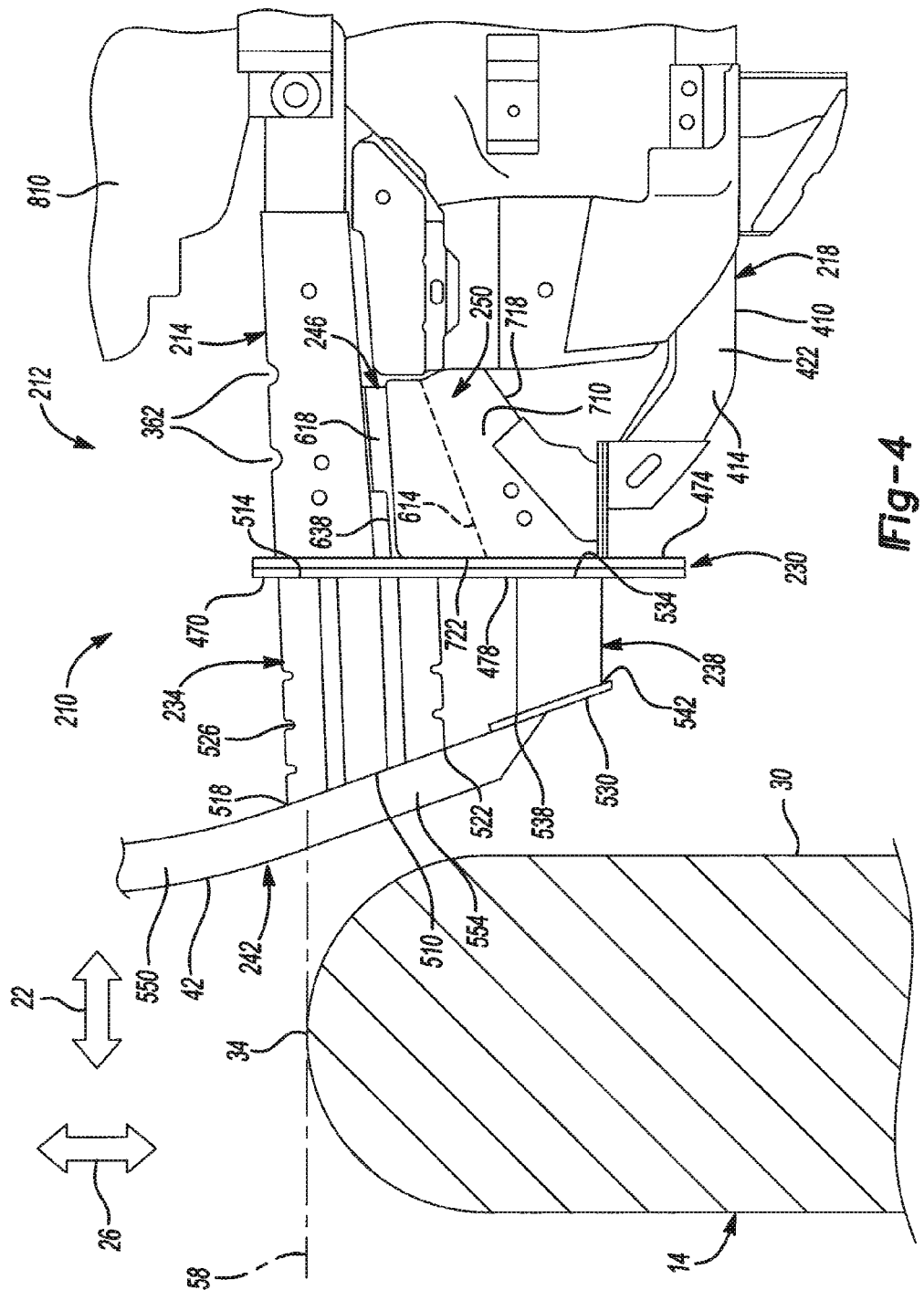
FIG. 4 is a top elevated view of the front left portion of the front structure of FIG. 2, illustrating the impact body of FIG. 1 in a pre-impact position.

With additional reference to FIGS. 2-4, a front left portion 210 of a vehicle front structure 212 is shown. In accordance with an aspect of the present disclosure, a vehicle such as vehicle 10 (FIG. 1) includes the front left portion 210. While only the front left portion 210 of the vehicle front structure 212 is illustrated, the front right portion (not shown) of the vehicle front structure 212 is similarly constructed. The front left portion 210 includes a side rail 214, a load beam 218, a pillar body 222, a support bracket 226, a front member 230, an inner crush can 234, an outer crush can 238, a bumper 242, an inner brace 246, and an outer brace or outrigger 250.

The side rail 214 has a front terminal end 310, proximate to the front 42 of the vehicle 10, and the side rail 214 extends in the longitudinal direction 22 from the terminal end 310 toward the rear 46 of the vehicle 10. The side rail 214 includes an inner shell 314 and an outer shell 318. The inner and outer shells 314, 318 have generally "U" or hat-shaped cross-sections, with each shell 314, 318 having a distal side 322, 326 respectively, an upper side 330, 334 respectively, a lower side 338, 342 respectively, an upper flange 346, 350 respectively, and a lower flange (not specifically shown). The upper and lower flanges 346, 350, generally form the "brim" of the hat-shaped cross-section, and run longitudinally along the side rail 214. The interiors of the U's, defined by the distal sides 322, 326 and the upper and lower sides 330, 334, 338, 342, face toward each other and the upper flanges 346, 350 and lower flanges are each welded to form a tubular structure. Thus, the distal side 322 forms an inner side of the tubular side rail 214 and the distal side 326 forms an outer side of the tubular side rail 214. In the example provided, the shapes of the inner and outer shells 314, 318 are each formed by stamping a sheet of material, such as steel for example.

The shape of the side rail 214 is configured to facilitate a degree of controlled deformation, under certain loads. In the example provided, the side rail 214 includes a plurality of indents 362 on the inner and outer shells 314, 318 to facilitate crumpling of a portion of the side rail 214. The side rail 214 is offset from the central axis 38. In the example provided, the side rail 214 is offset from the central axis 38 such that the terminal end 310 is approximately centered about the offset axis 58. In alternative constructions, not specifically shown, the side rail 214 can be wholly within, or substantially within the outer quarter 50 of the vehicle 10, or proximate to the offset axis 58 (i.e. within ±5% of being centered about the offset axis 58).

The load beam 218 is generally offset from the side rail 214 and laterally outward from the offset axis 58. The load beam 218 has a main portion 410 and a front end or nose portion 414. The nose portion 414 is proximate to the front 42 of the vehicle 10. The main portion 410 extends generally longitudinally from the nose portion 414 toward the rear 46 of the vehicle 10 and upwardly along an arcuate path to join with the pillar body 222 and form a wheel well 418 for housing a front wheel (not shown). The pillar body 222 generally forms the "A" pillar of the vehicle 10. The nose portion 414 curves inward from the main portion 410 toward the offset axis 58, and terminates before reaching the side rail 214. The load beam 218 includes an upper beam 422 and a lower beam 426. The upper and lower beams 422, 426 are each tubular structures that have generally rectangular cross-sections. The upper beam 422 is stacked above the lower beam 426.

The support bracket 226 is a stamped structure that has a generally "U" or hat-shaped cross-section. The support bracket 226 is overlapped by a stamped structure 446 to form a closed section. The support bracket 226 has an inner length 450 and an outer length 454. The inner length 450 is mounted (e.g. welded) to the outer shell 318 of the side rail 214 and extends laterally outward and upward from the side rail 214. The outer length 454 extends laterally outward and upward from the inner length 450, such that the inner and outer lengths 450, 454 form an interior angle that opens toward the ground. The outer length 454 is mounted (e.g. welded) to the main portion 410 of the load beam 218. Thus, the support bracket 226 extends laterally between the side rail 214 and the load beam 218.

In an aspect, the front member 230 is a generally flat, single piece that has an inner plate 470 and an outer plate 474 that are joined by a bridge 478. It should be understood that the front member 230 can have other configurations. The front member 230 is transverse to the side rail 214. The front member 230 has a forward side 482 that generally faces toward the front 42 of the vehicle 10, and a rearward side 486 that generally faces toward the rear 46 of the vehicle 10. In the example provided, the inner plate 470 defines a first aperture 490 and the outer plate 474 defines a second aperture 494. The first and second apertures 490, 494 penetrate through the front member 230 from the forward side 482 to the rearward side 486. The rearward side 486 of the inner plate 470 is mounted (e.g. welded) to the terminal end 310 of the side rail 214 such that the outer plate 474 extends in the lateral direction 26 outward from the inner plate 470. The first aperture 490 generally aligns with the hollow tubular area of the side rail 214 formed by the interiors of the "U" shaped inner and outer shells 314, 318.

The inner crush can 234 is a tubular body that has a generally rectangular cross-section. The inner crush can 234 has a forward end 510 and a rearward end 514. The rearward end 514 is mounted (e.g. welded) to the forward side 482 of the inner plate 470. The hollow interior (not specifically shown) of the tubular inner crush can 234 generally aligns with the first aperture 490 of the inner plate 470, such that the tubular body of the inner crush can 234 surrounds the first aperture 490. The forward end 510 is angled relative to the rearward end 514, such that an inner edge 518 of the forward end 510 extends further in the longitudinal direction 22 toward the front 42 of the vehicle 10 than an outer edge 522 of the forward end 510. The inner crush can 234 has a shape that facilitates controlled crushing or crumpling under certain loads in the longitudinal direction 22. In the example provided, the inner crush can 234 also includes a plurality of notches 526 that are spaced longitudinally apart and penetrate through the corners of the inner crush can 234 to facilitate crumpling.

The outer crush can 238 is a tubular body that has a generally rectangular cross-section. The outer crush can 238 has a cross-sectional area that is smaller than the inner crush can 234. The outer crush can 238 has a forward end 530 and a rearward end 534. The rearward end 534 is mounted (e.g. welded) to the forward side 482 of the outer plate 474. The hollow interior (not specifically shown) of the tubular outer crush can 238 generally aligns with the second aperture 494 of the outer plate 474, such that the tubular body of the outer crush can 238 surrounds the second aperture 494. The forward end 530 is angled relative to the rearward end 534, such that an inner edge 538 of the forward end 530 extends further in the longitudinal direction 22 toward the front 42 of the vehicle 10 than an outer edge 542 of the forward end 530. The outer crush can 238 has a shape that facilitates controlled crushing or crumpling under certain loads in the longitudinal direction 22. The outer crush can 238 is laterally outward and spaced apart from the inner crush can 234. The forward end 530 of the outer crush can 238 is longitudinally rearward of the forward end 510 of the inner crush can 234.

The bumper 242 is a tubular body that has a generally rectangular cross-section and is disposed generally across the front 42 of the vehicle 10. The bumper 242 has a central length 550 and an end length 554. The central length 550 extends generally in the lateral direction 26 across the front 42 of the vehicle 10 and in the example provided extends generally across the inner quarter 54 of the vehicle 10. The end length 554 curves or is angled relative to the central length 550 toward the rear 46 of the vehicle 10, and extends at least partially into the outer quarter 50 of the vehicle 10. In the example provided, the end length 554 is formed at a similar angle as the forward ends 510, 530 of the inner and outer crush cans 234, 238. The bumper 242 is mounted (e.g. welded) to the forward ends 510, 530 of the inner and outer crush cans 234, 238. In the example provided, the bumper 242 does not extend in the lateral direction 26 fully across the outer crush can 238 to the outer edge 542 of the outer crush can 238, though other configurations can be used.

With specific reference to FIG. 3, an exploded view of a portion of the front left portion 210 is shown including a portion of the side rail 214, the front member 230, part of the inner length 450 of the support bracket 226, the inner brace 246, and the outer brace 250. The inner brace 246 is, for example, formed by stamping a sheet of material, such as steel. The inner brace 246 has a top or transverse wall 610, a base 614 which in the illustrative embodiment is an outer wall of the inner brace, an upper flange 618, a rear flange 622, and a pair of lower flanges 626, 630. The transverse wall 610 and base 614 are generally perpendicular to each other to form a generally "L" shaped cross-section. The inner brace 246 is mounted to the side rail 214 such that a leading or front edge 634 of the transverse wall 610 and base 614 aligns with the terminal end 310 of the side rail 214. An inner edge 638 of the transverse wall 610 overlaps with a portion of the upper side 334 of the outer shell 318. The upper flange 618 is generally perpendicular to the transverse wall 610 and extends from the inner edge 638 to overlap a portion of the upper flange 350 of the outer shell 318. The upper flange 618 of the inner brace 246 is mounted (e.g. welded) to the upper flange 350 of the outer shell 318. In an alternative construction, not specifically shown, the inner edge 638 of the transverse wall 610 overlaps with a portion of the lower side 342 of the outer shell 318. In this construction, the upper flange 618 a lower flange (not shown) that is generally perpendicular to the transverse wall 610 and extends from the inner edge 638 to overlap a portion of the bottom flange (not shown) of the outer shell 318. The lower flange of the inner brace 246 is mounted (e.g. welded) to the lower flange of the outer shell 318.

The transverse wall 610 has a generally trapezoidal shape. The front edge 634 of the transverse wall 610 forms the base of the trapezoid and a rear edge 642 of the transverse wall 610 forms the top of the trapezoid. The base of the trapezoid is a length that spaces the base 614 of the inner brace 246 apart from the side rail 214. The top of the trapezoid is a length that is shorter than the base such that the base 614 of the inner brace 246 is angled toward the side rail 214 to become more near to the side rail 214 with increasing distance from the front 42 of the vehicle 10. The base 614 of the inner brace 246 is angled to be diagonal between the side rail 214 and the front member 230 and form an acute angle with the side rail 214 that is between 15 degrees and 20 degrees. The top of the trapezoid is a length that is greater than the lateral length of the upper side 334 of the outer shell 318, such that the base 614 of the inner brace 246 remains spaced apart from the side rail 214 along the entire longitudinal length of the base 614. The bottom of the trapezoid is a length such that the front edge 634 of the base 614 is offset from the central longitudinal axis 38 by at least 20 percent of the total lateral width of the vehicle (10).

The rear flange 622 extends laterally outward from the base 614 of the inner brace 246 and overlaps with part of the inner length 450 of the support bracket 226. The rear flange 622 is mounted (e.g. welded) to the inner length 450 of the support bracket 226. The front edge 634 of the base 614 of the inner brace 246 aligns with the bridge 478 of the front member 230. The front edge 634 of the inner brace 246 is mounted (e.g. welded) to the front member 230. The lower flanges 626, 630 extend laterally inward from the base 614 of the inner brace 246 toward the side rail 214. Each lower flange 626, 630 extends generally parallel to the transverse wall 610 of the inner brace 246. The lower flanges 626, 630 are spaced apart from each other longitudinally along the base 614. In the example provided, the lower flanges 626, 630 extend laterally inward a length such that they do not overlap with the side rail 214. In the example provided, the lower flanges 626, 630 are mounted (e.g. welded) to the outer brace 250, as described below.

The outer brace 250 is, for example, formed by stamping a sheet of material, such as steel. The outer brace 250 has a top wall 710, a bottom wall 714, and base 718 which in the illustrative embodiment is an outer wall of outer brace 250. The top and bottom walls 710, 714 are generally parallel to and spaced apart from each other. The base 718 is generally perpendicular to the top and bottom walls 710, 714 and extends there between, such that the outer brace 250 forms a generally "U" shaped lateral cross-section. A portion of the top wall 710 of the outer brace 250 overlaps with the transverse wall 610 of the inner brace 246 and a portion of the bottom wall 714 of the outer brace 250 overlaps with the bottom wall 714 of the inner brace 246. A leading or front edge 722 of the outer brace 250 aligns with the terminal end 310 of the side rail 214. The front edge 722 of the outer brace 250 is mounted (e.g. welded) to the front member 230 along a length of the inner and outer plates 470, 474, such that the portion of the front edge 722 that extends along the base 718 of the outer brace 250 is laterally outward of the second aperture 494.

An inner edge 726 of the top wall 710 of the outer brace 250 overlaps with a portion of the upper side 334 of the outer shell 318 and is mounted (e.g. welded) to either the outer shell 318 or the transverse wall 610 of the inner brace 246. An inner edge 730 of the bottom wall 714 of the outer brace 250 overlaps with the lower side 342 of the outer shell 318 and is mounted (e.g. welded) thereto. The bottom wall 714 of the outer brace 250 overlaps with the lower flanges 626, 630. The lower flanges 626, 630 are mounted (e.g. welded) to the interior surface of the bottom wall 714 of the outer brace 250. The base 718 has a first portion 734 and a second portion 738. The first portion 734 extends from the front edge 722 of the outer brace 250 toward the rear 46 of the vehicle 10. In the example provided, the first portion 734 extends generally parallel to the offset axis 38 or the side rail 214. The first portion 734 is mounted (e.g. welded) to the nose portion 414 of the load beam 218. The second portion 738 extends longitudinally rearward and laterally inward from the first portion 734 such that it is angled toward the side rail 214 to become more near to the side rail 214 with increasing distance from the front 42 of the vehicle 10. The second portion 738 is angled to be diagonal between the side rail 214 and the front member 230 and form an acute angle relative to the side rail 214 that is between 30 degrees and 35 degrees. The acute angle between the side rail 214 and the second portion 738 can be greater than the acute angle between the side rail 214 and the base 614 of the inner brace 246. The top and bottom walls 710, 714 are a length such that the base 718 is spaced apart from the base 614 of the inner brace 246 along the entire length of the base 718. The top and bottom walls 710, 714 are a length such that the front edge 722 of the base 718 is offset from the central longitudinal axis 38 by at least 15 percent of the total lateral width of the vehicle (10). The second portion 738 is mounted (e.g. welded) to the inner length 450 of the support bracket 226. Thus, the outer brace 250 completely surrounds and partially supports the inner brace 246.

Figure 5:
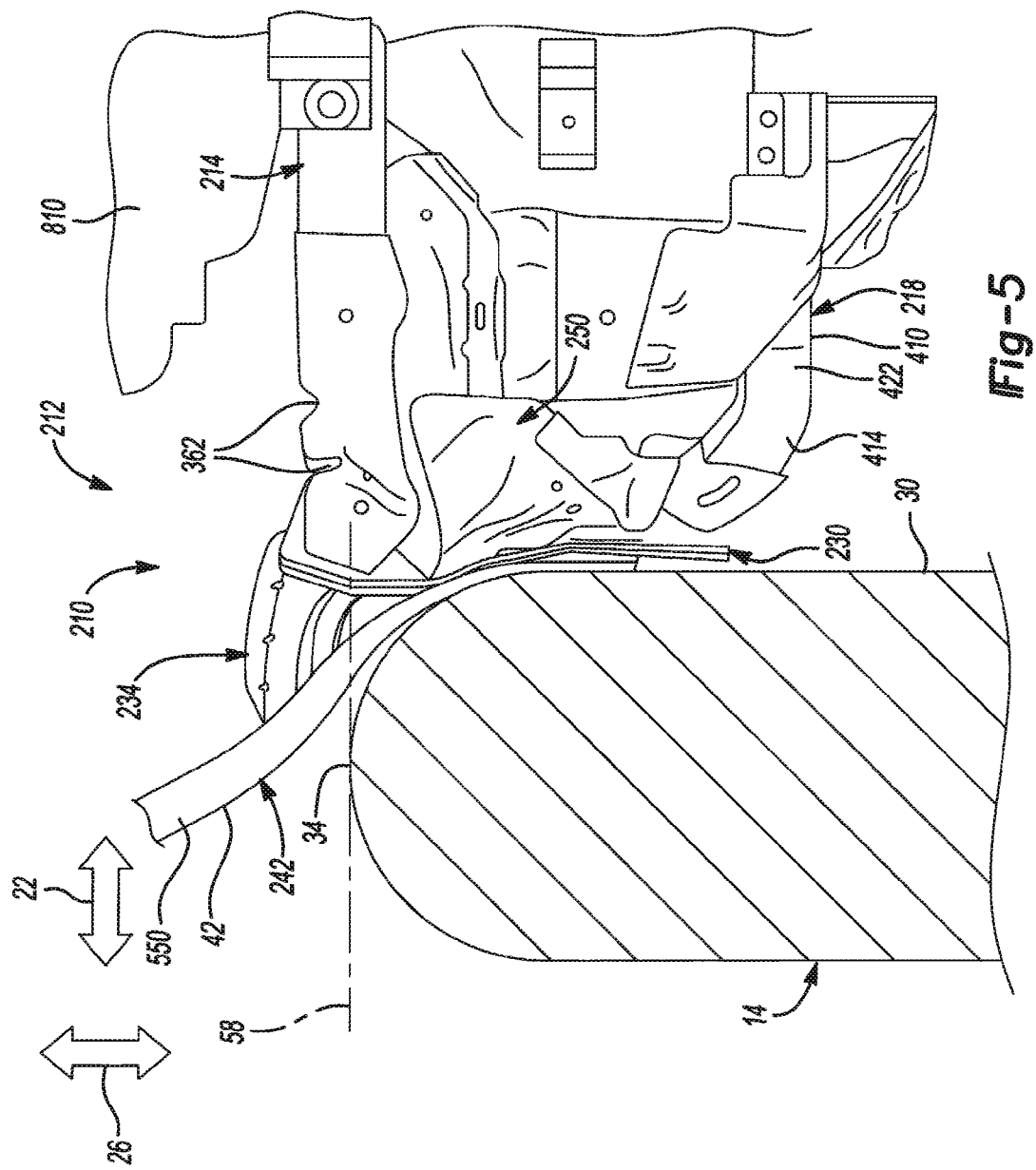
FIG. 5 is a top elevated view similar to FIG. 4, illustrating the vehicle after a first amount of time following impact with the impact body.
Figure 6:
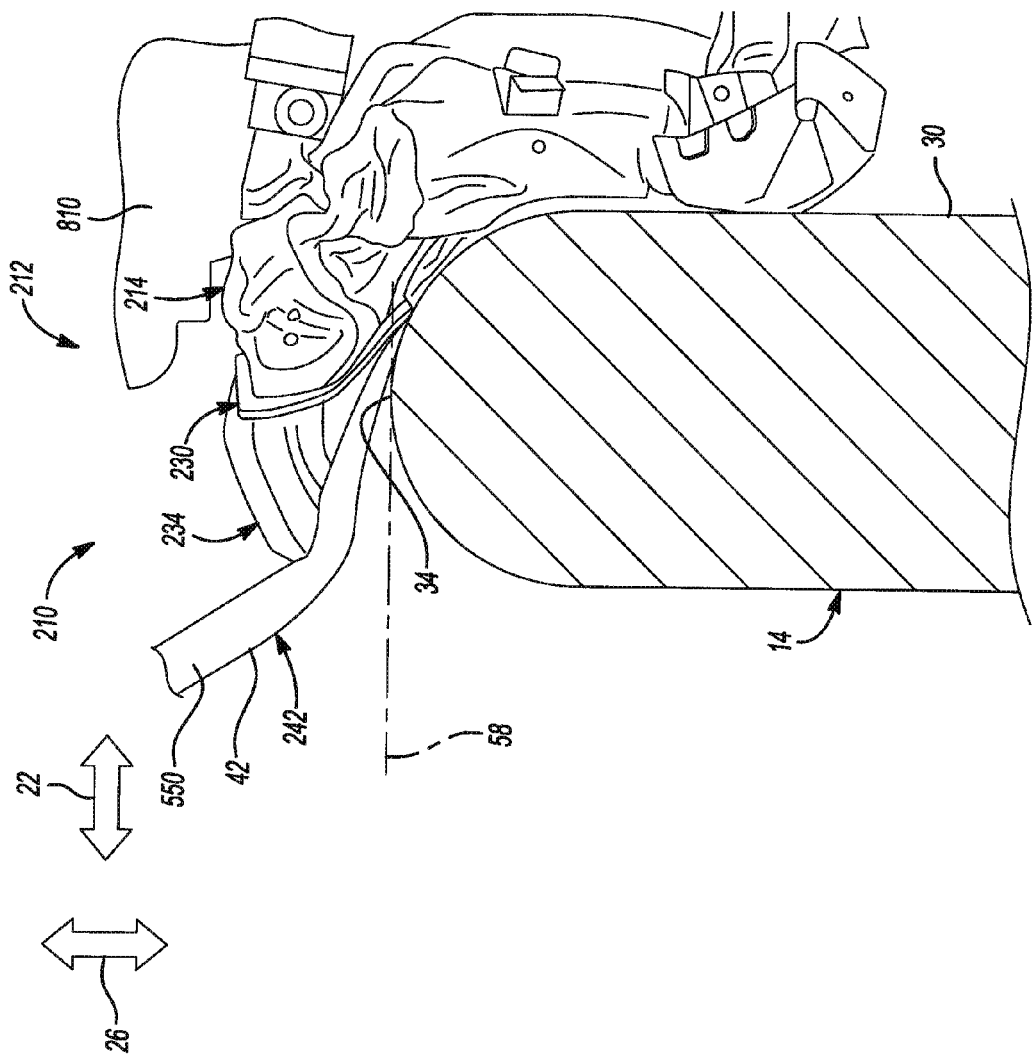
FIG. 6 is a top elevated view similar to FIG. 5, illustrating the vehicle after a second amount of time following impact with the impact body.

With additional reference to FIGS. 5 and 6, a portion of the front left portion 210 is shown in various states of impact with the barrier 14. FIG. 4 shows the front left portion 210 prior to impact. FIG. 5 shows the front left portion 210 after a first amount of time after impact. FIG. 6 shows the front left portion 210 after a second, longer amount of time after impact. Since the front edge 634 of the inner brace 246 extends laterally outward from the side rail 214, and vertically along the bridge 478 between the inner and outer crush cans 234, 238, the longitudinal impact forces are transmitted through the inner and outer crush cans 234, 238 and the front member 230 to the inner brace 246 along the entire lateral length of the inner brace 246. The angled orientation of the base 614 of the inner brace 246 and trapezoidal shape of the transverse wall 610 converts some of the longitudinally directed impact forces received between the side rail 214 and the outer crush can 238 to lateral forces that are directed into the side rail 214 at the juncture of the support bracket 226 and the side rail 214.

Since the front edge 722 of the outer brace 250 extends laterally outward from the side rail 214, and extends generally vertically proximate to a laterally outer side of the outer crush can 238, the longitudinal impact forces are transmitted through the inner and outer crush cans 234, 238 and front member 230 to the outer brace 250 along the entire lateral length of the outer brace 250. The outer brace 250 adds additional rigidity to the front left portion 210 along the portion where the outer brace 250 overlaps with the inner brace 246. The angled orientation of the second portion 738 of the outer brace 250 converts some of the longitudinally directed impact forces received along the length of the outer brace 250, to lateral forces that are directed into the side rail 214 at the support bracket 226.

As shown in FIGS. 5 and 6, after impact, the inner and outer crush cans 234, 238 absorb some of the longitudinal impact forces by controlled crumpling. A portion of the side rail 214 also absorbs some of the longitudinal forces by controlled crumpling. The lateral forces directed by the inner brace 246 and outer brace 250 into the side rail 214 cause the side rail 214 to bend laterally into an engine and/or transmission 810 of the vehicle 10, to transfer the lateral forces into the engine/transmission 810. Since the engine/transmission 810 is a significant mass of the vehicle 10, these lateral forces imparted into the engine/transmission 810 cause the vehicle 10 to move in the lateral direction 26 away from the barrier 14. The controlled deformation and conversion of longitudinal velocity into lateral velocity helps absorb small offset impact forces and facilitates moving the vehicle 10 away from the barrier 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle having a front structure, comprising:
a left side rail extending longitudinally in a front portion of the vehicle on a left side of an engine of the vehicle and a right side rail extending longitudinally in the front portion of the vehicle on a right side of the engine of the vehicle;
a left front member coupled to a front end of the left side rail and extending in a laterally outward direction from the left side rail and being at least partially disposed in an outer left quarter of a total width of the vehicle, and a right front member coupled to a front end of the right side rail and extending in a laterally outward direction from the right side rail and being at least partially disposed in an outer right quarter of the total width of the vehicle;
a left outer brace having a top side, a bottom side, and a base that extends between the top and bottom sides of the left outer brace apart, and a right outer brace having a top side, a bottom side, and a base that extends between the top and bottom sides of the right outer brace; and
a left inner brace extending between and coupled to the left front member and the left side rail, the left inner brace having a base disposed between the top and bottom sides of the left outer brace, the base of the left inner brace extending diagonally between the left front member and the left side rail, and a right inner brace extending between and coupled to the right front member and the right side rail, the right inner brace having a base disposed between the top and bottom sides of the right outer brace, the base of the right inner brace extending diagonally between the right front member and the right side rail;
wherein each side rail includes a top side, a bottom side, an inner side and an outer side that form a tubular structure, wherein a portion of the top side of each outer brace overlaps with the top side of the side rail coupled to that outer brace, and a portion of the bottom side of the outer brace overlaps with the bottom side of the side rail coupled to that outer brace.

2. The front structure of claim 1 wherein each side rail is disposed proximate to a respective one of a pair of offset axis, each respective offset axis is disposed on a same side of the vehicle as each corresponding side rail, each offset axis is offset from a central longitudinal axis of the vehicle by twenty-five percent of a total lateral width of the vehicle.

3. The front structure of claim 1, wherein the base of the left outer brace connects the top and bottom sides of the left outer brace to form a generally U-shaped cross-section open toward the left side rail, and the base of the right outer brace connects the top and bottom sides of the right outer brace to form a generally U-shaped cross-section open toward the right side rail.

4. The front structure of claim 1, wherein each inner brace includes a transverse wall that extends laterally inward from the base of the inner brace toward the side rail to which that inner brace is coupled.

5. The front structure of claim 4, wherein the transverse wall of each inner brace overlaps with one of the top and bottom sides of the side rail to which that inner brace is coupled.

6. The front structure of claim 1, further comprising a left inner crush can mounted to the left front member on a front side of the left front member, wherein a front edge of the base of the left inner brace is disposed laterally outward of the left inner crush can, and a right inner crush can mounted to the right front member on a front side of the right front member, wherein a front edge of the base of the right inner brace is disposed laterally outward of the right inner crush can.

7. The front structure of claim 6, further comprising a left outer crush can mounted to the left front member on the front side of the left front member and laterally outboard of the left inner crush can, wherein the front edge of the base of the left inner brace is coupled to the left front member at a point laterally between the left inner and left outer crush cans, and a right outer crush can mounted to the right front member on the front side of the right front member and laterally outboard of the right inner crush can, wherein the front edge of the base of the right inner brace is coupled to the right front member at a point laterally between the right inner and right outer crush cans.

8. The front structure of claim 1, further comprising right and left load beams, each load beam having a main portion and a front end, the main portion of each load beam at least partially defining a respective wheel well of the vehicle, the front end of the right load beam coupled to the right outer brace and the front end of the left load beam coupled to the left outer brace.

9. The front structure of claim 8 further comprising a right support member that extends between the right side rail and the main portion of the right load beam, wherein the right outer brace is coupled to the right support member, and a left support member that extends between the left side rail and the main portion of the left load beam, wherein the left outer brace is coupled to the left support member.

10. The front structure of claim 1, wherein each inner brace includes a flange that extends laterally inward from the base of that inner brace and is coupled to one of the top and bottom sides of the outer brace.

11. The front structure of claim 1, wherein the left inner brace includes a transverse wall, the transverse wall of the left inner brace having a side edge that extends longitudinally along the left side rail and a leading edge that extends laterally outward from the left side rail, the base of the left inner brace being coupled to the transverse wall of the left inner brace, and wherein the right inner brace includes a transverse wall, the transverse wall of the right inner brace having a side edge that extends longitudinally along the right side rail and a leading edge that extends laterally outward from the right side rail.

12. The front structure of claim 1, wherein the left outer brace extends between the left side rail and the left front member and contacts the left front member, and the right outer brace extends between the right side rail and the right front member and contacts the right front member.

13. The front structure of claim 1, wherein the left inner brace is coupled to the left outer brace and the right inner brace is coupled to the right outer brace.

14. The front structure of claim 1, wherein the base of the left outer brace is spaced apart from the base of the left inner brace and the base of the right outer brace is spaced apart from the base of the right inner brace.

\* \* \* \* \*